United States Patent
Gauthier et al.

(10) Patent No.: US 6,769,567 B2
(45) Date of Patent: Aug. 3, 2004

(54) PRODUCT DISPENSER

(75) Inventors: Jonathan C. Gauthier, Bennington, VT (US); Richard H. Chapman, Camillus, NY (US)

(73) Assignee: Eveready Battery Company, Inc., St. Louis, MO (US)

(*) Notice: Subject to any disclaimer, the term of this patent is extended or adjusted under 35 U.S.C. 154(b) by 55 days.

(21) Appl. No.: 10/336,142

(22) Filed: Jan. 3, 2003

(65) Prior Publication Data

US 2004/0129717 A1 Jul. 8, 2004

(51) Int. Cl.$^7$ ................................................ G07F 11/00
(52) U.S. Cl. .................................... 221/79; 206/703
(58) Field of Search .......................... 221/79, 88, 87, 221/76, 13, 105, 268, 82, 122, 133; 206/704, 701, 703

(56) References Cited

U.S. PATENT DOCUMENTS

| | | | |
|---|---|---|---|
| 610,522 | A | 9/1898 | Brown |
| 1,116,043 | A | 11/1914 | Elliott |
| 2,359,679 | A | 10/1944 | Roehrl |
| 2,790,587 | A | 4/1957 | Contant |
| 3,187,889 | A | 6/1965 | Sinclair |

(List continued on next page.)

FOREIGN PATENT DOCUMENTS

| | | |
|---|---|---|
| CA | 2212112 | 2/1999 |
| EP | 0473190 A2 | 3/1992 |
| GB | 2071618 A | 9/1981 |
| JP | 20043936 | 2/2000 |
| WO | WO 02/020371 | 3/2002 |

*Primary Examiner*—Kenneth Noland
(74) *Attorney, Agent, or Firm*—Russell H. Toye, Jr.

(57) ABSTRACT

A product dispenser is provided that enables product to be released from an adhesive attachment and transition from the interior of the dispenser to the exterior of the dispenser using a single rotation motion. The dispenser comprises a product platform, product adhesively secured to a strip and a base. The product platform comprises an upper surface and a lower surface and an opening through the platform. The adhesive strip comprises two major surfaces, one of which is free of adhesive and one with adhesive located on at least a portion thereof. The base comprises an upper surface and a lower surface and an opening through the base. The adhesive strip is threaded through both the product platform opening and the base opening and one end of the strip is attached to the lower surface of the base. The product platform and the base are fitted together so as to be rotatable with respect to each other about a common axis, with the lower surface of the product platform facing the upper surface of the base. The adhesive strip is positioned so that the nonadhesive surface of the strip is in contact with the upper surface of the product platform. Product, such as zinc air cells, are adhesively attached to the adhesive surface of the strip. In the case of zinc air cells, the adhesive strip functions as a tab until the cells are ready to be detabbed for activation and use. Rotation of either the base or the product platform so as to create relative motion between the two structures will cause the product to advance toward the opening in the product platform as the adhesive strip moves through the opening in the product platform. Product is separated from the adhesive strip as the strip moves through the product platform opening. Continued rotation advances the released product from the interior of the dispenser to the exterior of the dispenser.

20 Claims, 5 Drawing Sheets

U.S. PATENT DOCUMENTS

| | | | |
|---|---|---|---|
| 3,394,796 | A | 7/1968 | Jensen |
| 3,437,236 | A | 4/1969 | Huck |
| 3,476,239 | A | 11/1969 | Jacob |
| 3,633,792 | A | 1/1972 | Steigerwald |
| 3,881,257 | A | 5/1975 | Chasen |
| 3,897,265 | A | 7/1975 | Jaggard |
| 3,990,578 | A | 11/1976 | Roeser |
| 3,995,767 | A | 12/1976 | Brindley |
| 4,015,708 | A | 4/1977 | Kelm |
| 4,124,143 | A | 11/1978 | Thomas |
| 4,209,091 | A | 6/1980 | Lieberman |
| 4,591,539 | A | 5/1986 | Oltman et al. |
| 4,649,090 | A | 3/1987 | Oltman et al. |
| 4,696,402 | A | 9/1987 | Harmon et al. |
| 4,791,034 | A | 12/1988 | Dopp |
| 4,860,890 | A | 8/1989 | Cerny et al. |
| 4,953,700 | A | 9/1990 | DeDino |
| 5,033,616 | A | 7/1991 | Wyser |
| 5,117,977 | A | 6/1992 | Voroba |
| 5,129,546 | A | 7/1992 | Thielmann |
| 5,199,565 | A * | 4/1993 | Voroba .................. 206/704 |
| 5,203,455 | A | 4/1993 | Hewelt et al. |
| 5,308,711 | A | 5/1994 | Passaniti et al. |
| 5,404,105 | A | 4/1995 | Chari |
| 5,477,981 | A | 12/1995 | Heyl et al. |
| 5,647,507 | A | 7/1997 | Kasper |
| 5,795,667 | A | 8/1998 | McKenzie et al. |
| 5,804,327 | A | 9/1998 | Oltman |
| 5,839,583 | A | 11/1998 | Pope et al. |
| 6,039,185 | A | 3/2000 | Pedracine et al. |
| 6,164,490 | A | 12/2000 | Bishop et al. |
| 6,329,095 | B1 | 12/2001 | Farnworth et al. |
| 6,488,176 | B2 | 12/2002 | Garrant et al. |
| 6,581,799 | B1 * | 6/2003 | Garrant et al. .................. 221/88 |
| 2002/0030062 | A1 | 3/2002 | Garrant et al. |

\* cited by examiner

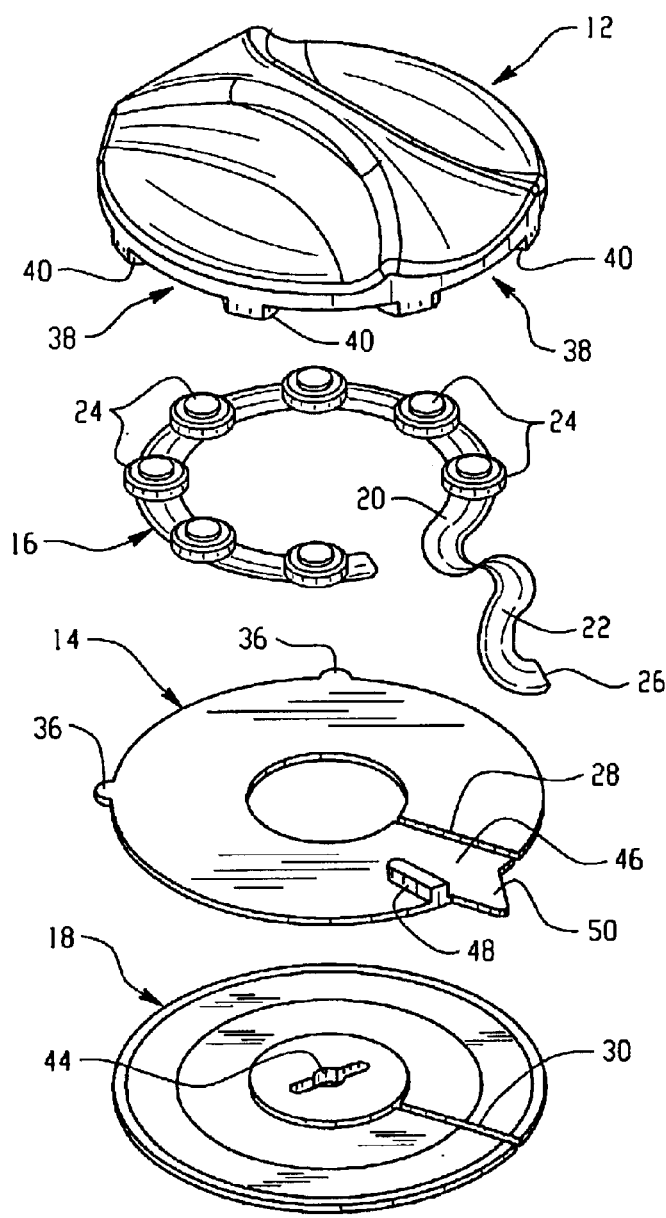
Fig. 6
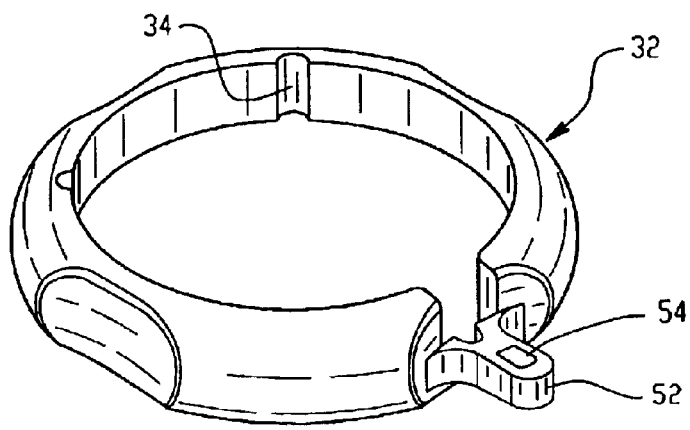

PRODUCT DISPENSER

BACKGROUND OF THE INVENTION

The present invention relates to a dispenser for housing and dispensing product, such as miniature batteries including zinc air cells used in hearing aids. As used herein, "battery" means one or more cells.

Handling of miniature batteries is difficult because of their small size. Direct physical handling of miniature batteries is typically required in order to remove the batteries from their packaging, to insert the batteries in the proper orientation into a device, and, in the case of air cells, to remove any individual tabbing associated with the cell prior to use. Tabbing is normally associated with metal air cells such as zinc air cells. The tabs limit the ingress of oxygen into the cell until such time as the cell is placed into service by covering openings located within the cell housing, typically on the underside of the cell in the what is referred to as the cathode can. The tab also functions to limit the transport of water vapor in or out of the cell and limits the ingress of carbon dioxide into the cell. Typically, the tab comprises an adhesive material covering one or more of the aforementioned openings, or air ports. Upon removal of the tab, the ports are exposed to the oxygen of the ambient environment, thereby enabling the cell to be activated and used in a device, such as a hearing aid. The challenge of handling miniature batteries in the manners outlined above is exacerbated in the event the user suffers from reduced dexterity, poor vision or other physical infirmity.

Efforts to address some of these issues are found in the art. For example, U.S. Pat. No. 6,039,185 discloses a device for inserting a hearing aid battery into a hearing aid. The device comprises so-called "petals" joined together to form a multipetal structure with an air cell residing on each petal. The cells are individually tabbed, and each tab is then adhered to the petal. The cell is inserted into the hearing aid by gripping the multipetal structure and bringing the appropriate petal up close to the hearing aid battery door to enable the cell to be engaged within the door. The cell is then separated from the inserter using a wiping motion, purportedly leaving the tab adhered to the petal. The method of separating the cell from its associated tab and the inserter as disclosed in the '185 patent places stresses on the hearing aid device, presenting the potential for damage to the device.

Typical packaging for miniature zinc air cells presents further problems. Common to packaging for miniature zinc air cells is disclosed for example in U.S. Pat. No. 4,593,700. The packaging disclosed therein consists of a thermoformed or molded blister rotatably attached to a paperboard card. The blister comprises multiple compartments each containing an individually tabbed cell or battery. A battery is dispensed from the package by rotating the blister to align a loaded compartment with a trap door accessible from the back of the card. This dispensing design has several defects associated with it. For example, the trap door can come open during transport and batteries will fall out. The trap door becomes weak and ineffective after multiple uses. The base of the dial can also separate or pull away from the card allowing batteries to fall out. Finally, the consumer must still handle the battery in order to remove the tab, properly orient the cell in connection with the device terminals and insert the cell into the device once the battery has been removed from the package.

Some consumers use a separate tool to assist them in loading miniature batteries into devices. For example, a device consisting of a magnet positioned at one end of an elongated wand has been used for this purpose. The tool can be easily misplaced and provides little aid in removing the individual tabbing associated with common zinc air cells.

One approach has been developed for addressing the need to house cells, dispense them from the package, untab them and insert them into a device. The approach is described in commonly-owned U.S. patent application Ser. Nos. 09/658,201, 09/764,579 and 09/837046, the entire disclosures of said commonly-owned applications hereby incorporated by reference as if fully set forth herein. In general, the approach of these applications is to provide a dispenser that functions to house cells or other products, dispense the cells or other products onto an integral landing and place the cells or products directly into a device or other location where the product is used. The dispenser described in this approach untabs the cell prior to insertion into a device without the need to physically handle either the cell or an associated tab, and therefore dramatically increases the ease with which miniature air cells can be used to power devices such as hearing aids. However, the dispenser of this approach requires two discrete actions to dispense a cell or other product onto the landing: the base and cover must be rotated with respect to each other to align a cell into a dispensing position, and a thumbpiece must be operated to untab the cell and transition it from the interior of the dispenser out onto the landing.

Handling of other small products including but not limited to pharmaceuticals such as pills, foodstuff such as candy, hardware such as screws, and the like can be equally difficult because of their size, particularly for those users suffering from reduced dexterity, poor vision or other physical infirmity. While the within invention is illustrated in connection with miniature cells, and in particular in connection with miniature zinc air cells, it will be appreciated that the within invention can also be utilized in connection with the transport, storage and dispensing of such other small products. As used herein, the term "product" is not limited to miniature cells or batteries, and fully comprehends such other small products as those identified above.

It is therefore a first object of the present invention to provide a product dispenser that acts as a structural package for housing and transporting product and a dispenser for removing product from the package and an inserter for manipulating and orienting product into a device or other end use location, without the need for multiple discrete dispenser operations.

It is also an object of the present invention to provide such a product dispenser that removes any direct handling of product prior to its insertion into a device or other end use location.

It is a further object of the present invention to provide such a product dispenser that obviates the need for direct handling of tab material in the case of a metal air cell such as a zinc air cell.

It is a further object of the present invention to provide such a product dispenser that both activates (by untabbing) and dispenses air cells such that the user does not have to handle the cell or the tabbing material before, during or after insertion into a device.

It is a further object of the present invention to provide such a product dispenser that eliminates the need for additional tools to handle and orient product for insertion or placement for end use.

It is a further object of the present invention to provide such a product dispenser that avoids unintended dispensing from the dispenser.

It is a further object of the present invention to provide a refill cartridge for such a product dispenser.

It is a further object of the present invention to provide such a product dispenser that optionally allows the user to attach a refill cartridge after removal of a spent cartridge.

It is a further object of the present invention to provide such a product dispenser that allows the consumer to store used product for disposal or material recovery purposes.

The foregoing and additional objects of this invention will become fully apparent from the following description and the accompanying drawings.

SUMMARY OF THE INVENTION

The present invention provides for a product dispenser that is easy to use for storing and dispensing product, such as miniature batteries. The dispenser of the within invention obviates the need to handle the product at any point during the dispensing process or during the insertion or placement process of the product for its end use. The dispenser of the within invention achieves this result with a single action device, whereby a single manipulation of the dispenser of the within invention orients the product into a dispensing position, transfers the product from the interior of the dispenser to the exterior of the dispenser, untabs the product in the case of a zinc air cell product and removably retains the product on the exterior of the dispenser to facilitate final placement of the product without the need to ever directly touch the product.

To achieve this and other advantages, and in accordance with the purposes of the present invention as embodied and described herein, the present invention provides for a product dispenser comprising a product platform, an adhesive strip and a base. The product platform comprises an upper surface and a lower surface and an opening through the platform. The adhesive strip comprises two major surfaces, one of which is free of adhesive and one with adhesive located on at least a portion thereof. The base comprises an upper surface and a lower surface and an opening through the base. The adhesive strip is threaded through both the product platform opening and the base opening and one end of the strip is attached to the lower surface of the base. The product platform and the base are fitted together so as to be rotatable with respect to each other about a common axis, with the lower surface of the product platform facing the upper surface of the base. The adhesive strip is positioned so that the nonadhesive surface of the strip is in contact with the upper surface of the product platform. Product, such as zinc air cells, are adhesively attached to the adhesive surface of the strip. In the case of zinc air cells, the adhesive strip functions as a tab until the cells are ready to be detabbed for activation and use. Rotation of either the base or the product platform so as to create relative motion between the two structures will cause the product to advance toward the opening in the product platform as the adhesive strip moves through the opening in the product platform. Product is separated from the adhesive strip as the strip moves through the product platform opening while the product follows an opposing path of travel. After separation from the adhesive strip, the product can be transitioned from the interior of the dispenser to the exterior of the dispenser.

In a preferred embodiment, a dispenser cover is also provided that aids in protecting the product during storage and transport, and also facilitates positioning the product in the product dispensing position and transitioning the product from the interior to the exterior of the dispenser. In this embodiment, a landing is also provided for removably retaining product on the exterior of the dispenser, enabling the user to grip the larger and more manageable dispenser rather than the product itself while orienting the product for final insertion into a device or other end use.

In another embodiment the bottom side of the base farther comprises a storage area for storing used product for disposal or material recovery purposes. The entire dispenser could be processed for material recovery or otherwise recycled. In the event the cover and the base are separable, the base alone could be processed for material recovery or otherwise recycled.

In another embodiment the cover is made of semi opaque material and the base or cover or both can be color coded to indicate various product characteristics, such as size.

In another embodiment the cover further comprises a handle for controlling the rotation of the base with respect to the product platform.

These and other features, advantages, and objects of the present invention will be further understood and appreciated by those skilled in the art by reference to the following specification, claims, and appended drawings.

BRIEF DESCRIPTION OF DRAWINGS

FIG. 6 is an exploded view of a dispenser according to the within invention.

DETAILED DESCRIPTION OF THE PREFERRED EMBODIMENTS

Figure 1:
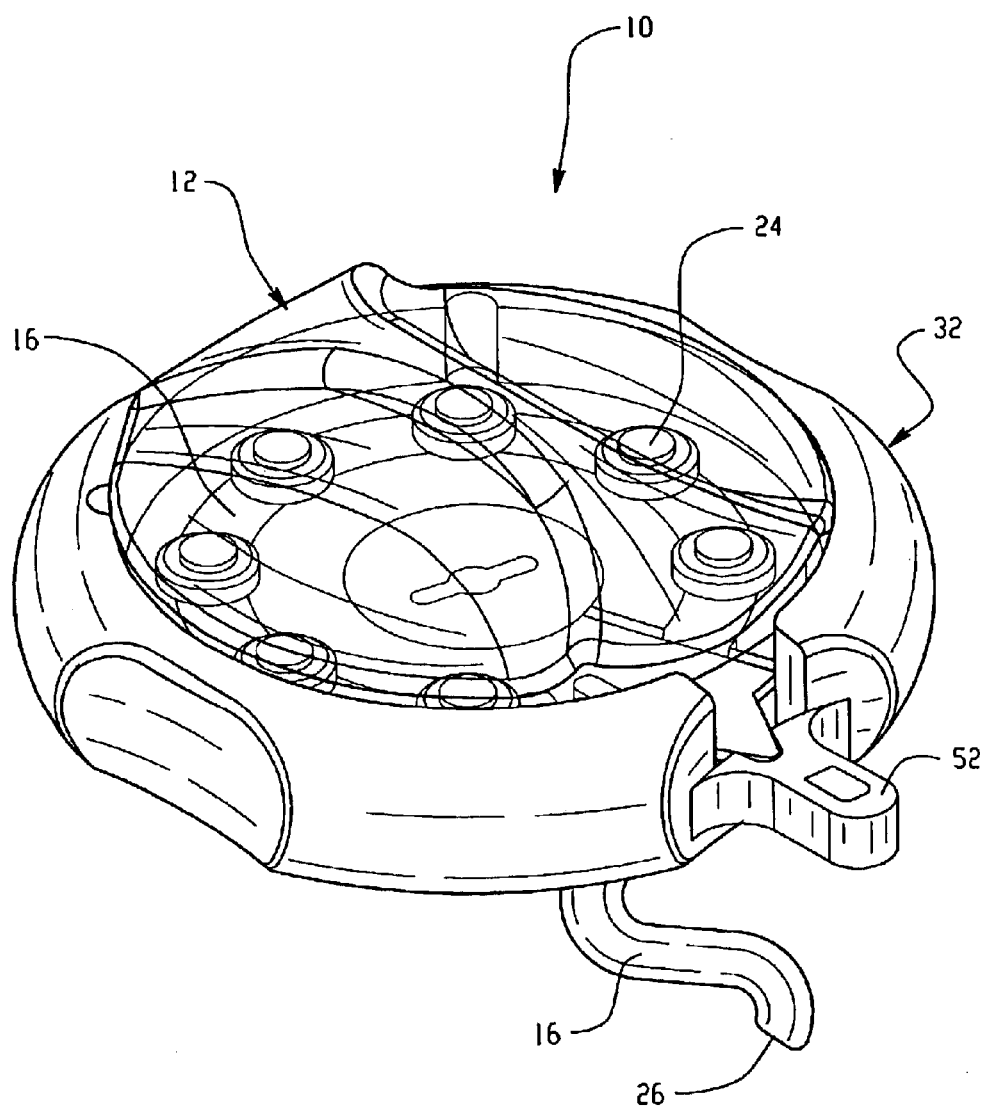
FIG. 1 is a perspective view of a dispenser according to the within invention.
Figure 2:
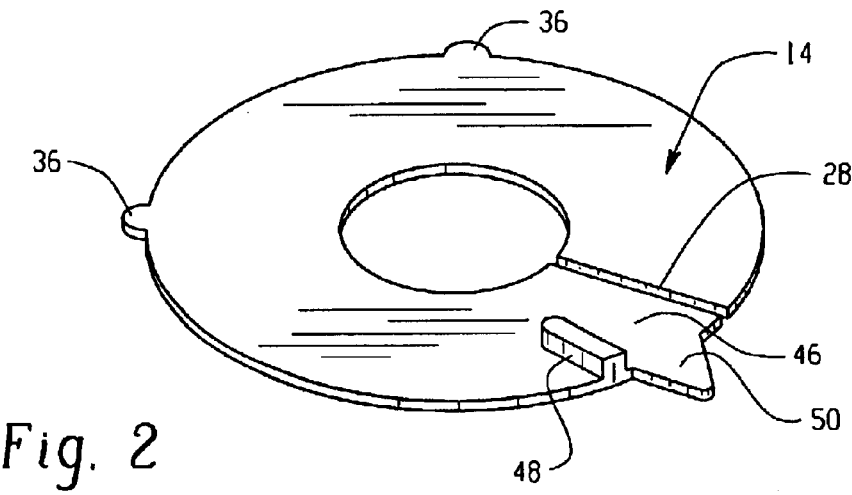
FIG. 2 is a perspective view of a product platform of a dispenser according to the within invention.
Figure 3:
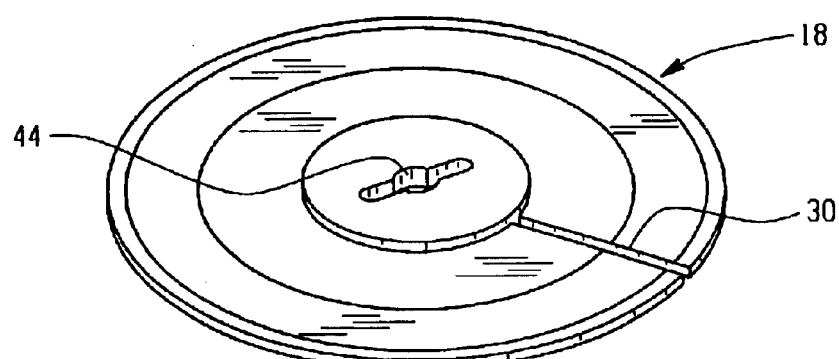
FIG. 3 is a perspective view of a base of a dispenser according to the within invention.
Figure 4:
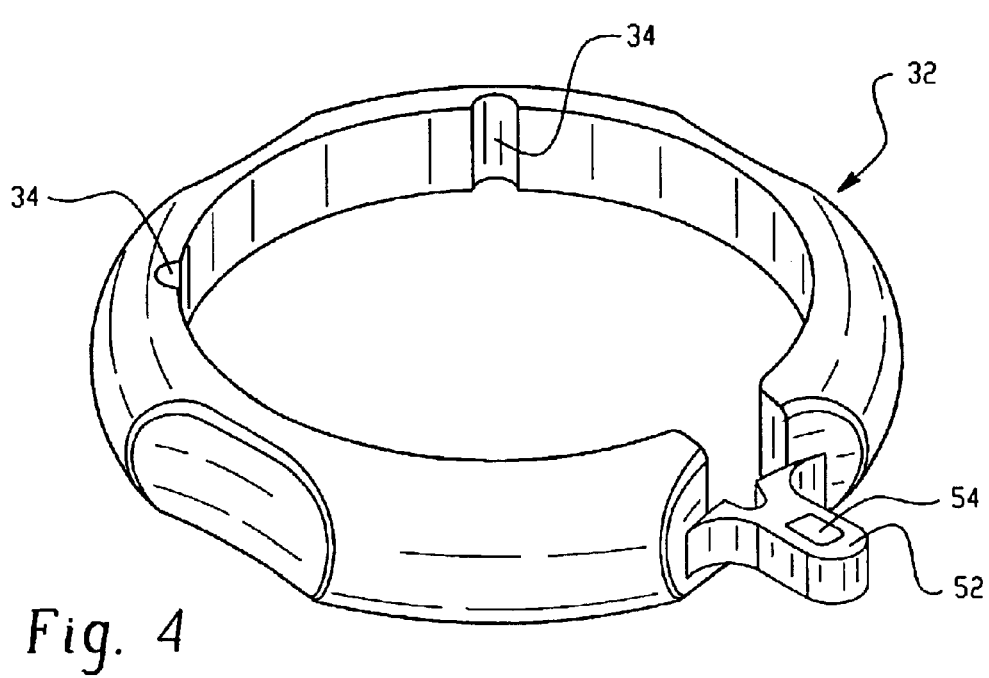
FIG. 4 is a perspective view of an exterior base of a dispenser according to the within invention.
Figure 5A:
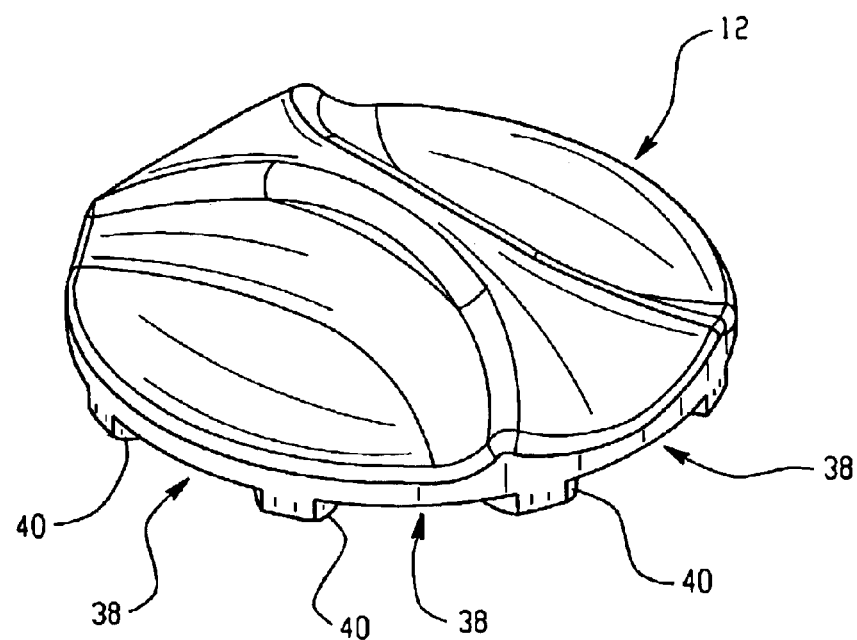
FIG. 5A is a perspective view of a cover of a dispenser according to the within invention.
Figure 5B:
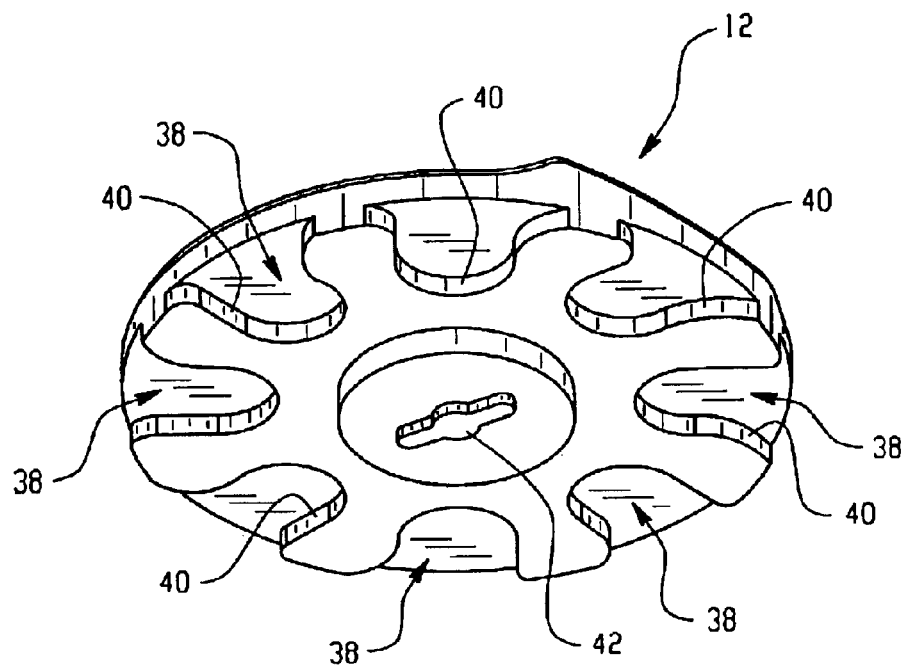
FIG. 5B is a bottom view of the cover of FIG. 2A.

The specific embodiments illustrated in the appended drawings and described in the following specification are simply exemplary embodiments of the inventive concept defined in the appended claims. Hence, specific dimensions and physical characteristics relating to specific embodiments disclosed herein are not to be considered as limiting, unless the claims expressly state otherwise.

The preferred embodiment of the dispenser 10 of the within invention comprises a product platform 14, an adhesive strip 16 and an interior base 18. The adhesive strip 16 has two major opposing surfaces 20, 22. One surface 20 is an adhesive surface on which products 24 exemplified herein as zinc air cells are affixed. The other strip surface 22 is free of adhesive. The strip 16 is formed so as to coincide with the perimeter shape of the product platform 14. As illustrated herein, the product platform is round and the adhesive strip 16 is formed to enable positioning of the strip about a major portion of the circumference of the product platform 14. The strip 16 is placed on the upper surface of the product platform 14 so that strip surface 22 faces the product platform 14. The strip 16 is therefore not adhesively secured to the upper surface of the product platform 14, enabling relative motion between the strip 16 and the product platform 14.

The leading end 26 of the adhesive strip 16, defined herein as that end nearest to the first cell to be dispensed, is threaded through an opening 28 in the product platform 14. This assembly of product platform 14 and adhesive strip 16 is joined to the interior base 18 about a common axis of rotation in a manner that will enable relative motion between the product platform and the interior base 18. The leading end 26 of strip 16 is also fed through an opening 30 in the interior base 18. The leading end 26 of strip 16 is permanently affixed to the interior base 18 on the undersurface thereof This assembly of the strip 16 with product 24 affixed thereto, the product platform 14 and the interior base 18 can release product from the adhesive strip and therefore dispense product in a single action. As more fully discussed herein, by causing the rotation of the product platform 14 with respect to the interior base 18, or vice versa, so as to cause product 24 closest to the leading end 26 of strip 16 to encounter the opening 28 in the product platform 14, product 24 will be released from the adhesive surface 20 of the strip 16.

In the preferred embodiment, the assembly of product platform 14, strip 16, product 24 and interior base 18 is then positioned within an exterior base 32. The exterior base 32 serves to provide a convenient structure for gripping the dispenser 10 and for providing relative motion between the product platform 14 and the interior base 18. The product platform 14 and the exterior base 32 are joined such that they move together. For example, the exterior base 32 can be equipped with one or more internal indents 34 into which projections 36 on the product platform 14 will fit. Thus, the product platform 14 and the exterior base 32 will undergo the same relative motion with respect to the interior base 18. The external base 32 can optionally include indents along the outer perimeter to facilitate gripping, operation and manipulation of the dispenser.

Suitable materials for the external base 32, product platform 14 and internal base 18 include durable moldable polymer materials as are known in the art. The adhesive strip 16 can be any adhesive material suitable for retaining product on the strip and in position within the dispenser during storage and shipping. In the case of zinc air cells 28, the adhesive strip is preferably a suitable tabbing material as is used in the manufacture of zinc air cells. It will be appreciated that the selection of a suitable adhesive will be governed at least in part by the characteristics of the products that will be adhered to the adhesive strip and their anticipated storage, handling and shipping experience.

In the preferred embodiment, the dispenser further comprises a cover 12. The cover comprises one or more product chambers 38 formed by walls 40 extending from the interior cover ceiling. When the cover is placed over the product platform 14 with the adhesive strip 16 and the product 24 in place, it will be appreciated that each product to be dispensed resides within one product chamber 38. The cover 12 and the interior base 18 are joined such that they move together. For example, the cover 12 can be equipped with a projecting key 42 that is positioned within a cooperating keyhole 44 located on the interior base 18. Thus, the cover 12 and the interior base 18 will undergo the same relative motion with respect to the product platform 14 and the exterior base 32.

Suitable materials for the cover include any durable moldable polymer material as is known in the art. Preferably, at least a portion of the cover is transparent to enable the product contained in the dispenser to be viewed by the user.

Figure 7A:
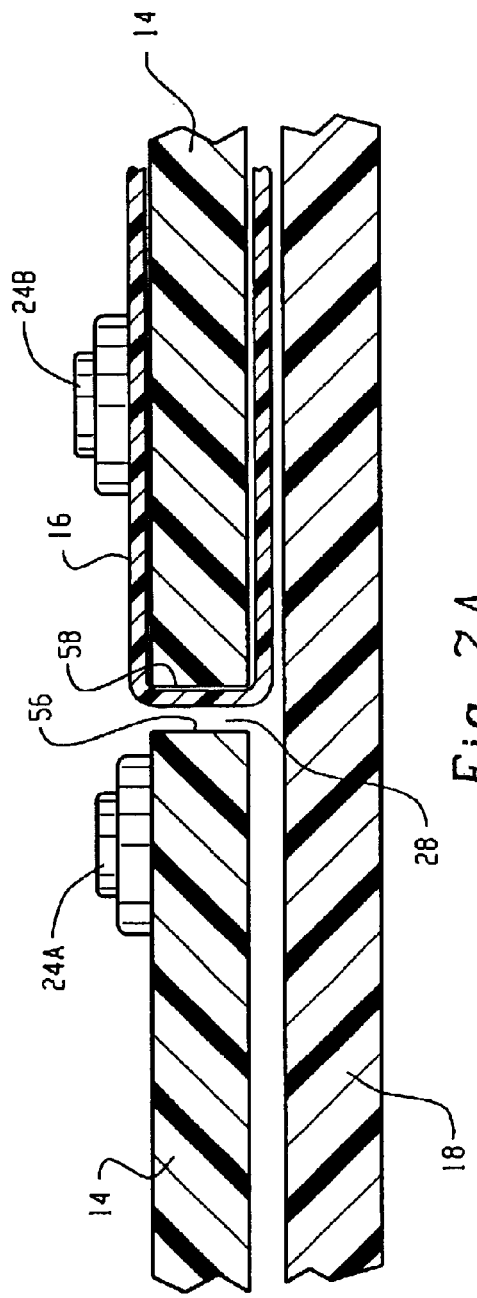
FIG. 7A is a view of the product platform and the adhesive strip according to one aspect of the within invention.

During the rotation of the cover 12 and the interior base 18 with respect to the product platform 14 and the exterior base 32, the product 24 encounters the opening 28 in the product platform 14. The strip 16 passes through the opening 28 and is peeled from the product 24. The peeling action is caused by reversing the path of travel of the strip as it passes through the opening 28, so that the strip moves from a point over the proximal edge 58 of the opening 28, around the proximal edge 58 and to a point under the proximal edge of the opening 28. See FIG. 7A, showing just released product 24A and product to be released 24B, and the path of travel of the strip 16.

Once the product 24 has been released from the strip 16, the product is available for dispensing by transitioning from the interior of the dispenser to the exterior of the dispenser. The continued rotation described above causes the released product to encounter the product chamber walls 40. It will be appreciated that the walls will be configured so as to cause the released product 24 to move towards a predetermined product dispensing position 46 on the product platform 14 during the relative rotation motion described above. The configuration of the chamber walls will vary, depending in part on the shape of the product to be dispensed as well as the distance to be traveled by the released product following release from the adhesive strip.

In the preferred embodiment of the within invention, the product platform 14 further comprises a product guide 48 and a transition landing 50, and the exterior base 32 further comprises an external landing 52. The single above described relative rotation movement causes the product 24 to be released from the adhesive strip 16, to move from the product dispensing position 46 onto the transition landing 50 and to move from the transition landing onto the external landing 52, thereby transferring product from the interior of the dispenser to the exterior of the dispenser. The product guide 48 cooperates with the chamber walls 40 to move the released product into the appropriate position. The transition landing 50 is preferably integral with the product platform 14 and projects through an opening in the sidewall of the exterior base 32, thereby further preventing relative motion between the product platform 14 and the external base 32.

The external landing 52 preferably comprises a magnetic component 54 secured to the landing. The magnetic component 54 aids in controlling and removably maintaining metallic products such as zinc air batteries on the landing 52 while the user is orienting the product for final placement within a device or other disposition. Alternatively, as dictated by the product, other surfaces or materials, such as velcro or adhesives, may be utilized for controlling and removably maintaining products on the landing 52 as will be appreciated by those skilled in the art. These alternate surfaces or materials may comprise the entire landing 52 or may be secured to the landing 52 via an adhesive or other securing method. Further, the magnetic component 54 can be planar or otherwise shaped, and may be exposed or embedded within the landing. Where product use and placement permit, the landing 52 may further include a stop wall (not shown) at the distal end of the landing to further control the forward motion of the product as it transitions from the interior of the dispenser onto the landing.

Removable retention of nonmetallic product on the landing can further be accomplished by extending an overhanging pincher (not shown) that extends over the landing 52 and results in a downward pressure on the product 24, or by pinchers (not shown) on the landing itself that create an interference with the product 24 as it is dispensed onto the landing.

Optionally, indexing positions can be incorporated into the design of the dispenser of the within invention as is known in the art. Such indexing positions provide the user with a mechanical stopping point for the required rotation sufficient to release product from the adhesive strip and transfer product from the interior of the dispenser to the exterior of the dispenser. The underside of the base optionally comprises a storage compartment (not shown) for spent product storage.

In another aspect of this embodiment of the within invention, the dispenser can, be reused by discarding all or a portion of the assembly of the product platform 14, strip 16 and interior base 18 once all of the product 24 has been completely dispensed. A refill kit, comprising fresh product to be dispensed in a preassembled assembly comprising a product platform, strip, interior base and product is provided for re-introduction into the dispenser for use with the original cover 12 and exterior base 32.

Figure 7B:
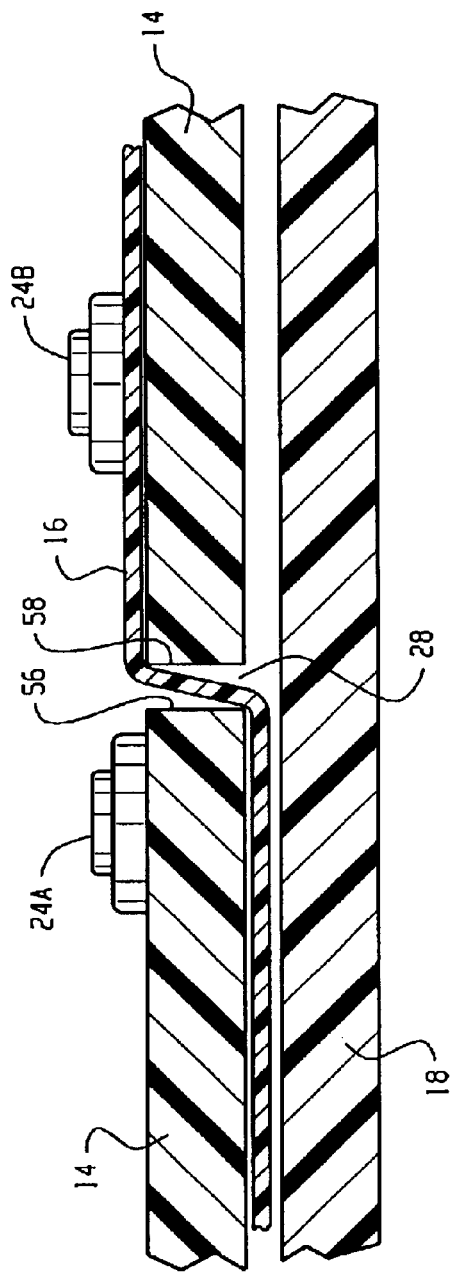
FIG. 7B is an alternate view of the product platform and the adhesive strip according to another aspect of the within invention.

In an alternate method of employing the dispenser of the within invention, the adhesive strip is not peeled from the product 24. Rather, the product is scrapped from the adhesive strip. In this method, the relative rotation motion of the cover 12 and the interior base 18, on the one hand, and the product platform 14 and the exterior base 32, on the other hand, proceeds in the opposite direction, such that the path of travel of the strip 16 upon passing through the product platform opening 28 is the same as its path of travel prior to passing through the opening. Thus, the rotation motion causes the distal edge 56 of opening 28 to be interjected between the strip 16 and the product 24 as the strip passes through the opening 28. In contrast to the peeling release mechanism described above, the strip 16 does not pass over and around and under the proximal edge 58 of the opening 28. Rather, the strip 16 moves from a point over the proximal edge 58 to a point under the distal edge 56. See FIG. 7B, showing just released product 24A and product to be released 24B, and the path of travel of the strip 16.

Although only a few embodiments of the present invention have been described above, it should be appreciated that many modifications can be made without departing from spirit and scope of the invention. The specification is intended to include modifications and alterations insofar as they come within the scope of the appended claims or the equivalents thereof.

The invention claimed is:

1. A dispenser for transporting, housing and dispensing product, said dispenser comprising:
    a product platform comprising an opening through the platform;
    an adhesive strip comprising a leading end and two major surfaces with adhesive located on at least a portion of one of said two major surfaces;
    a base comprising an opening through the base,
    wherein said leading end is passed through the product platform opening, the base opening and attached to the base.

2. The dispenser of claim 1, wherein said product platform and said base rotate about a common axis with respect to each other.

3. The dispenser of claim 2, further comprising an exterior base having a sidewall and connected to said product platform so as to move with the product platform.

4. The dispenser of claim 3, wherein said sidewall has an opening.

5. The dispenser of claim 4, wherein said exterior base further comprises an external landing adjacent said sidewall opening.

6. The dispenser of claim 5, wherein said external landing further comprises a magnet.

7. The dispenser of claim 5, wherein said external landing further comprises one or more pinchers for creating an interference between the dispensed product and the said one or more pinchers.

8. The dispenser of claim 6, wherein said product comprises one or more miniature zinc air cells.

9. The dispenser of claim 5, further comprising a cover.

10. The dispenser of claim 9, wherein said cover further comprises product chambers.

11. The dispenser of claim 10, wherein said product platform further comprises a product guide.

12. A method for dispensing product from a product dispenser, said method comprising:
    providing a product platform, product adhesively secured to an adhesive strip having a first end and a second end, and an interior base; providing an opening in said platform and said base; threading a first end of said strip through said platform opening and said base opening and securing said first end to the base;
    positioning said strip with affixed product onto one surface of the product platform; joining said platform and said base together such that they can rotate relative to each other about a common axis; and causing the rotation of said platform with respect to said base until said product is released from said adhesive strip.

13. The method of claim 12, wherein said product is released from said adhesive strip by peeling said strip from said product.

14. The method of claim 12, wherein said product is release from said adhesive strip by causing the interjection of an edge between said product and said strip.

15. The method of claim 13, further comprising the steps of providing an exterior base joined to said product platform such that they move together, wherein said base further comprises a sidewall, an opening in said sidewall and an exterior landing adjacent said opening.

16. The method of claim 15, further comprising the steps of providing a cover with one or more product chambers for moving product released from the strip from the interior of the dispenser onto the exterior landing.

17. The method of claim 14, further comprising the steps of providing an exterior base joined to said product platform such that they move together, wherein said base further comprises a sidewall, an opening in said sidewall and an exterior landing adjacent said opening.

18. The method of claim 17, further comprising the steps of providing a cover with one or more product chambers for moving product released from the strip from the interior of the dispenser onto the exterior landing.

19. A refill kit for a product dispenser, said refill kit comprising a product platform, product adhesively secured to an adhesive strip having a first end and a second end, and an interior base; said platform and said base each further comprising an opening; said strip passing through said openings and said first end of said strip attached to said base; said strip with affixed product positioned onto one surface of the product platform; said platform and said base joined together such that they can rotate relative to each other about a common axis.

20. The refill kit of claim 19, wherein said product comprises miniature zinc air cells.

* * * * *